United States Patent [19]

Johansson

[11] 4,115,151

[45] Sep. 19, 1978

[54] METHOD AND APPARATUS FOR WORKPIECE SURFACE TREATMENT

[75] Inventor: Bengt Johansson, Göteborg, Sweden

[73] Assignee: Centro-Maskin Göteborg AB, Göteborg, Sweden

[21] Appl. No.: 800,410

[22] Filed: May 25, 1977

[30] Foreign Application Priority Data

Jun. 4, 1976 [SE] Sweden .............................. 7606357

[51] Int. Cl.² ............................................. B23K 7/06
[52] U.S. Cl. ........................................ 148/9.5; 266/51
[58] Field of Search ........................... 148/9.5; 324/37; 266/51

[56] References Cited

U.S. PATENT DOCUMENTS

| | | | |
|---|---|---|---|
| 2,125,176 | 7/1938 | Jones | 148/9.5 |
| 3,676,959 | 7/1972 | Forster | 324/37 |
| 3,822,632 | 7/1974 | Chigiotti | 148/9.5 |

*Primary Examiner*—W. Stallard
*Attorney, Agent, or Firm*—Thompson, Birch, Gauthier & Samuels

[57] ABSTRACT

The present invention relates to a method and an apparatus for treating the surface of a workpiece. The invention ensures correct working of the workpiece surface and renders an accurate control of the working place in question possible.

The removal of worked material during the working can also be carried out expediently according to the invention, which shows both a method, at which the working occurs during several working steps, and an apparatus for carrying out the method which in the embodiment shown is an apparatus for gas planing working where ignition and extinction of each separate nozzle is simplified and at the same time the melt can be handled more easily.

5 Claims, 1 Drawing Figure

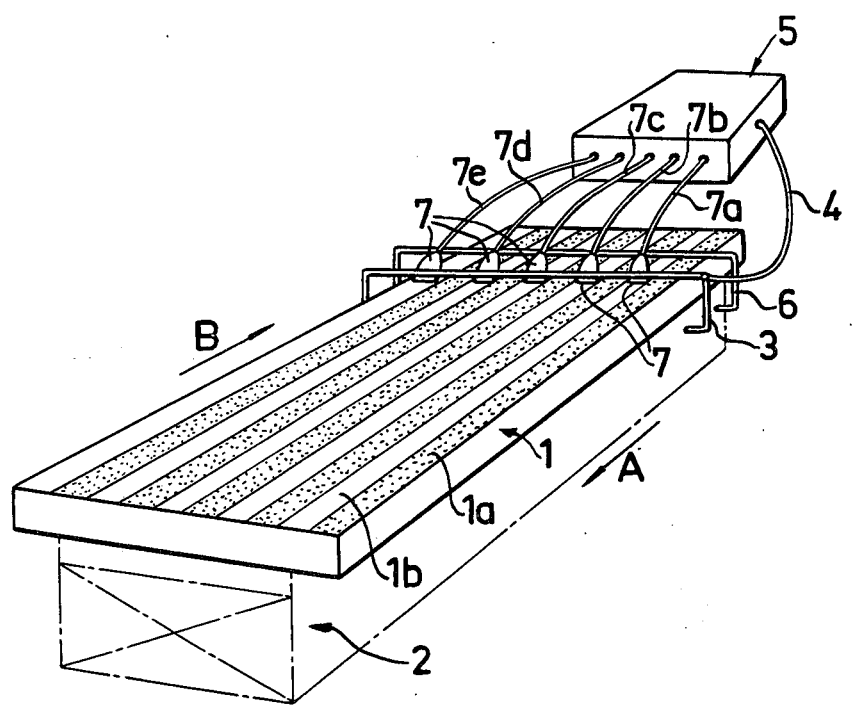

METHOD AND APPARATUS FOR WORKPIECE SURFACE TREATMENT

This invention relates to a method of surface treating a workpiece and to an apparatus for carrying out the method.

It is previously known when treating the surface of a workpiece in order to remove defects, such as cracks, slag inclusions and the like, to work the whole surface of the workpiece. The defects to be removed, however, are distributed randomly over the workpiece surfaces, which renders working of the whole workpiece surface uneconomical. It also is previously known to work the surface at selected locations or spots where defects have been discovered. In this case the extent of the working operation is limited, and valuable material and time can be saved.

The spot working can take place by a melting oxidizing method. For steel workpieces with extensive surfaces it can be difficult to arrange the working devices so as to cover the entire workpiece surface. In gas planing it is known to laterally arrange a plurality of nozzles in rows in order to obtain overlapping of the flames. This arrangement renders it difficult to ignite and extinguish individual nozzles and also makes it more difficult to handle the developing melt.

The present invention has as its primary objective the solution of the aforesaid problems.

Due to the division of the spot working to take place during at least two feed operations, there are good possibilities of arranging the working devices in a very advantageous way. In the case of working by oxygen planing the necessary special type of planing nozzles permitting a flying start of the burner can be positioned suitably spaced transverse to the feed direction of the workpiece. The positioning of each working device in spaced relationship in the transverse direction, corresponding to the working width, provides the further advantage that each working device can operate independently and undisturbed by adjacent devices.

The invention is described hereinafter with reference to the accompanying drawing showing by way of an embodiment an apparatus for carrying out the method according to the invention where the working takes place by oxygen planing.

The workpiece 1, the surface of which is to be treated, is positioned on a feed table 2 provided with rollers. To the table 2 a device 3 for the indication and recording of defects is attached. Said device is coupled via the cable 4 to a control unit 5 with memory function. In the embodiment shown the recording of the surface defects preferably takes place in such a manner, that the workpiece 1 is fed past the indication and recording device 3 without any working taking place. The indicated defects are recorded, and their positions on the surface of the workpiece 1 are fed into the memory part of the control unit 5. The indication preferably can take place in the direction shown by the arrow A. Thereafter, a first working can take place while the workpiece 1 is being fed in the opposite direction — shown by arrow B — whereby the portions 1b are worked to the extent as there are defects recorded. When the planing nozzles 7 are mounted non-rotary on the ramp 6, a feed-back without working takes place before or while the nozzles 7 or the workpiece 1 are moved in transverse direction to the right and left, respectively, through a distance corresponding to the distance between two adjacent working devices 7. Thereafter, the shaded surface portions 1a are worked.

It is also possible to carry out indication and recording in two or more steps, in such a manner, that a first indication takes place only of the strip portions to be planed first, while the other indications occur continuously during the ongoing working operation.

From the memory part of the control unit 5 lines 7a–7e extend to the nozzles 7. The information fed into the memory part with respect to the location of the defects on the workpiece surface controls each working device during the working operation thereby, that a start impulse is given to the device when the position of a previously indicated and recorded defect passes beneath the device, whereby a defect removing working takes place. In addition to the positions of the defects, recording takes place also of their spread in the feed direction so as to enable the memory unit at the correct time to give an impulse for stopping the working operation when the defect entirely has passed the working device. The distance between the indication and recording device 3 and the ramp 6 for the working devices 7 can be chosen optionally, because the value of this distance can be fed into the control unit 5 for correcting the start and stop impulse for the devices in question, so that they correctly can start and stop, respectively, the working of the recorded defect on the workpiece surface.

It is also possible to arrange the indication and recording device 3 and the ramp 6 with working devices 7 movable in relation to a stationary workpiece 1.

The indication and recording, of course, can be carried out also at a station separate from the place of working.

The embodiment illustrates only the principle of the invention. At a construction according to the invention applied in practice also dust and fume evacuation installations are connected to the zone of working.

What I claim is:

1. A method of surface treating a workpiece by spot planing during relative movement between the workpiece and a plurality of planing devices, characterized in that the planing begins by a flying start and is accomplished during at least two feed steps with at least two laterally arranged planing devices in such a way that a strip of the workpiece between each planing device is left unworked during the first feed step, which strip, after a relative movement, transverse to the feed direction between the planing devices and the workpiece, will be worked during a subsequent feeding step.

2. A method according to claim 1, characterized in that the workpiece is fed past a device indicating defects on the workpiece surface, which device records the positions of the defects on the workpiece surface and retains the recordings in a memory unit, which controls the working during a subsequent feed stop.

3. A method according to claim 2, characterized in that the indication is carried out during a feed step without working.

4. An apparatus for working the surface of a workpiece and for carrying out the method according to claim 1, comprising a device for indicating and recording defects on the workpiece surface and working devices, characterized in that the working devices are positioned transverse to the working direction in a spaced relationship corresponding to the working width of the devices or a multiple thereof.

5. An apparatus according to claim 4, characterized in that the indication and recording device comprises a memory unit, which controls each working device to work only the recorded defects.

* * * * *